United States Patent

Beach et al.

[11] Patent Number: 5,562,876
[45] Date of Patent: Oct. 8, 1996

[54] METHOD OF MAINTAINING A LOW RESIDUE OPEN-CELL FELTED FOAM

[75] Inventors: Bradley L. Beach; Donald L. Elbert; Terence E. Franey; Sean D. Smith, all of Lexington, Ky.

[73] Assignee: Lexmark International, Inc., Greenwich, Conn.

[21] Appl. No.: 438,585

[22] Filed: May 10, 1995

[51] Int. Cl.⁶ .................................................. B29C 43/02
[52] U.S. Cl. .................................... 264/321; 264/344
[58] Field of Search ............................. 264/321, 344

[56]         References Cited

U.S. PATENT DOCUMENTS

| | | | |
|---|---|---|---|
| Re. 32,032 | 11/1985 | Pettingell | 264/321 |
| 2,961,710 | 11/1960 | Stark | 264/321 |
| 3,978,855 | 9/1976 | McRae et al. | 264/321 |
| 4,454,248 | 6/1984 | Pollock et al. | 264/321 |
| 5,104,908 | 4/1992 | Allred et al. | 521/150 |

FOREIGN PATENT DOCUMENTS 56-002138  1/1981  Japan .................... 264/321

*Primary Examiner*—Allan R. Kuhns
*Attorney, Agent, or Firm*—John A. Brady

[57]          ABSTRACT

Open-Cell urethane foam is thoroughly dried in a convection oven or controlled atmosphere and then compressed with heat to a felt immediately. Alternatively, the dried foam is sealed in a plastic bag until the felting step. The amount of non-volatile residue is significantly reduced to produce a foam for use to contain ink in an ink jet cartridge.

8 Claims, No Drawings

METHOD OF MAINTAINING A LOW RESIDUE OPEN-CELL FELTED FOAM

TECHNICAL FIELD

This invention is to the manufacture of felted, open-cell urethane foam having exceptionally low residues of non-volatile materials.

BACKGROUND OF THE INVENTION

Felted, open-cell urethane foam is employed in ink jet ink cartridges as a holder or wick for the ink. The foam fills the ink reservoir and ink in the reservoir is virtually entirely contained in the cells of the foam. This provides proper flow and metering of the ink to ejection chambers of the ink cartridge. Ink is ejected from small holes, termed nozzles, in the cartridge. At least for inks ejected by heating at the chamber to form vapor which propels the ink, the presence of residues typical of those from chemical degradation of urethane tends to clog the nozzles.

Prior to this invention foam used for the ink delivery in an ink jet cartridge contained levels of non-volatile residue in the range of 0.5% to above 3.0% by weight of the total weight. This residue consists of: 1) low molecular weight urethane resulting from the chain termination during foaming and from degradation of the urethane linkages during manufacture of the foam and 2) remnants of surfactant used as an ingredient in the foam formulation. Such residues deposit on the plate having the nozzles to cause clogs and other operational failures.

The prior art recognizes the existence of the residues and teaches removal of the residues by washing operations (U.S. Pat. Nos. 4,824,487 to Heffernan and 5,182,579 to Haruta et al). The problems with residues have remained, although reduced by the cleaning. Cleaning also has the disadvantages of: 1) adding cost and 2) requiring disposal and control of contaminated solvent from the cleaning process.

The foregoing U.S. Pat. Nos. 5,182,579 also reduces from previous levels the temperature during the compression between heated plates. This reduces the residues somewhat, but not enough under all conditions to eliminate problems with residue.

DISCLOSURE OF THE INVENTION

In accordance with this invention, an open-cell urethane foam is thoroughly dry at the time of the felting, which is compression between plates with heat. This drying can not be quantified, but it is known by experiment to be that achieved by extended exposure of the foam to air at dew point of about 40 degrees Fahrenheit(F) or less. in the specific embodiment the foam is heating at slightly above 200 degrees F. for at least 20 minutes. The foam is then promptly felted by compression between heated plates or is sealed in a bag or other nonporous container and promptly felted upon removal from the container.

The amount of non-volatile residue is significantly reduced and ink jet printing failure from cartridges filled with such foam attributable to such residues are substantially eliminated without washing the foam.

BEST MODE FOR CARRYING OUT THE INVENTION

The embodiment of primary interest is felted open-cell foam which is a polyurethane of propylene glycol, ethylene glycol and toluene diisocyanate polymerized using surfactants and catalysts in a manner generally known in the art. Details of formulation and some procedures to make the foam are trade secrets of the specific manufacturer. The felted foam of primary interest to this invention may be obtained from Foamex, Eddystone, Pennsylvania under the trademark SIF Felt. Such details of manufacture are not considered necessary to an understanding of this invention since this invention is to preventing deterioration at the urethane linkages, a mechanism which would not be functionally changed by characteristics of the foam not chemically affecting or changing those linkages.

The product of the polymerization reaction of propylene glycol, ethylene glycol and toluene diisocyanate is formed on a belt. Gases formed internally from the polymerization reaction result in an open cell foam. After this foaming is complete, the large body produced is cut repeatedly to form buns of size suitable for handling, typically 6 to 12 feet in length. This is also broadly conventional, with details being the trade secret of the manufacturer.

The buns of open cell form are subsequently filled with a reactant gas, specifically hydrogen and oxygen, and the gas is exploded, thereby physically further opening the walls of the cells to form an open cell foam, as is also known in the art. This is called reticulation.

The open cell foam buns are subsequently cut into 4 foot by 6 foot by about 5 inch sheets, which sheets are pressed in the 5 inch direction between hot plates at 340 degrees F. to reduce the 5 inch dimension to 1.6 inch and form a felt, as is also essentially conventional. This felt is then ready to cut into small units sized to fit into the ink cavity of an ink jet cartridge, which vary depending on the size of the cartridge.

The level of non-volatile residue is approximately 0.4% to 3.0% by weight after felting. The felting step has been observed to be the primary source of such residue. In accordance with this invention it is recognized that the large variation in non-volatile residue after felting is due to the degradation of the foam via hydrolysis utilizing the moisture in the air and the heat from the felting operation. As the moisture in the air increases, the equilibrium moisture content in the foam increases thereby increasing the extent of hydrolysis during the felting operation. The non-volatile residues are measured by extracting foam with the appropriate solvent and quantifying the amount of residue in the solvent. Typical solvents used are chloroform and isopropyl alcohol.

Non-volatile residue levels of 1.5% result in a significantly high incidence of field failure by deposits on the nozzle plate, particularly in cool environments. Further, the amount of random failures of nozzles and lessened print quality appears to increase with the level of non-volatile residue.

In accordance with this invention the primary requirement for prevention of the degradation which forms the non-volatile residues is to remove moisture in the pores of the foam and on the surface of the foam prior to felting. Acidic or basic water will degrade a polyurethane when in the presence of heat. Without this invention, the level of non-volatile residue has been observed to increase as the amount of moisture ambient to the foam increases. The level of non-volatile residue has been found to be less than half of that in foam felted on a humid day to that felted after being thoroughly dried in accordance with this invention.

The following procedure removes the moisture from the foam prior to felting to minimize non-volatile residues in the final felt.

1) After reticulation the foam is sliced into 4 ft. by 6 ft. by about 5 inch sheets.
2) The sheets are placed in a conventional oven heated to slightly more that 200 degrees F.
3) The sheets are kept in the oven at temperature for a minimum of 20 minutes.
4) The sheets are removed and immediately placed on the felt press and felted under normal conditions to reduce the 5 inch dimension to 1.6 inch with the top and bottom plates at about 340 degrees F. The sheet does not recover from the reduced thickness. The before and after felting dimensions may vary depending on the size of the cartridge to contain the foam.
5) Optionally, the sheets are placed in plastic bags, which are sealed to exclude outside air. This is typically for short periods as the bags may be imperfect in excluding ambient air, moisture in which will equilibrate with the foam and thereby wet the foam.

Although the extent of drying has not been calibrated, full equilibration of the buns with ambient air of dew point of about 40 degrees F. or less is effective to achieve the thorough drying of this invention. Accordingly, an alternative implementation is to maintain ambient air of the sheets at that dew point or less with the sheets in such ambient air sufficiently long to equilibrate with it.

Two sheets processed by this invention with the oven drying were compared with two sheets processed in the standard manner without this invention. The average non-volatile residue of the sheets from this invention was 1.1% by weight with standard deviation of 0.15. the average non-volatile residue of the standard sheets was 2.4% by weight with standard deviation of 0.77. Non-volatile residues of 1.2% by weight and below produced no related failure in representative tests.

Other alternatives to achieve the dryness of this invention before felting can be anticipated and would be in accordance with this invention.

We claim:

1. A method of making urethane felted foam for holding and delivering ink in an ink jet cartridge with no washing to remove non-volatile residue comprising controlling the environment of an open-cell urethane foam to obtain said foam having a water content equal to that obtained by substantially complete drying of said foam in ambient air at a dew point of less than about 40 degrees F. and maintaining said dry status while felting said foam by compression between heated plates.

2. The method of claim 1 in which said maintaining is performed by substantially immediately performing said compression.

3. The method as in claim 1 in which said maintaining is performed by sealing said foam in a nonporous container.

4. The method as in claim 3 in which said controlling is by environmentally controlling the ambient air to said foam to be at a dew point of 40 degrees F. or less.

5. The method as in claim 1 in which said controlling is by environmentally controlling the ambient air to said foam to be at a dew point of 40 degrees F. or less.

6. The method as in claim 2 in which said controlling is by environmentally controlling the ambient air to said foam to be at a dew point of 40 degrees F. or less.

7. A method of making urethane felted foam for holding and delivering ink in an ink jet cartridge with no washing to remove non-volatile residue comprising heating an open-cell urethane foam to more than about 200 degrees F. until said foam is substantially thoroughly dry and maintaining said dry status while felting said foam by compression between heated plates.

8. The method as in claim 7 in which said maintaining is performed by sealing said foam in a nonporous container.

* * * * *